(12) United States Patent
Spangler et al.

(10) Patent No.: US 10,774,575 B2
(45) Date of Patent: Sep. 15, 2020

(54) CONTROL SYSTEM FOR A MOTOR-DISPLACEABLE CARGO COMPARTMENT DEVICE OF A MOTOR VEHICLE

(71) Applicant: Brose Fahrzeugteile GmbH & Co. Kommanditgesellschaft, Bamberg, Bamberg (DE)

(72) Inventors: Martin Spangler, Laaber (DE); Sandra Kieser, Coburg (DE); Wolfgang Uebel, Weitramsdorf (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 258 days.

(21) Appl. No.: 15/749,448

(22) PCT Filed: Jul. 21, 2016

(86) PCT No.: PCT/EP2016/067358
§ 371 (c)(1),
(2) Date: Jan. 31, 2018

(87) PCT Pub. No.: WO2017/021158
PCT Pub. Date: Feb. 9, 2017

(65) Prior Publication Data
US 2018/0223587 A1 Aug. 9, 2018

(30) Foreign Application Priority Data

Jul. 31, 2015 (DE) .......................... 10 2015 112 589

(51) Int. Cl.
*E05F 15/73* (2015.01)
*B60N 2/30* (2006.01)
(Continued)

(52) U.S. Cl.
CPC ............ *E05F 15/73* (2015.01); *B60N 2/0224* (2013.01); *B60N 2/0228* (2013.01); *B60N 2/065* (2013.01);
(Continued)

(58) Field of Classification Search
USPC .......................................... 701/49
See application file for complete search history.

(56) References Cited

U.S. PATENT DOCUMENTS

| 5,844,486 A | 12/1998 | Kithil et al. |
| 5,929,769 A | 7/1999 | Garnault |

(Continued)

FOREIGN PATENT DOCUMENTS

| CN | 103168317 | 6/2013 |
| DE | 10235925 | 2/2004 |

(Continued)

OTHER PUBLICATIONS

Final Office Action for U.S. Appl. No. 15/581,821 dated Sep. 25, 2019 (11 pages).
(Continued)

*Primary Examiner* — Marthe Y Marc-Coleman
(74) *Attorney, Agent, or Firm* — Pauly, DeVries Smith & Deffner LLC

(57) ABSTRACT

A control system for a motor-displaceable cargo compartment device of a motor vehicle, wherein the cargo compartment device comprises a motor-displaceable closure element, wherein an operator occurrence sensor is provided, wherein a control arrangement monitors the operator occurrence sensor to determine whether a predetermined operator occurrence exists and, upon detection of such a predetermined operator occurrence, displaces the cargo compartment device with the aid of a motor, wherein the control arrangement displaces the closure element in the opening (Continued)

direction with the aid of a motor upon detection of a primary operator occurrence via the operator occurrence sensor. Further the cargo compartment device comprises at least one motor-displaceable cargo compartment component and the control arrangement displaces at least one such cargo compartment component with the aid of a motor upon detection, via the operator occurrence sensor, of a secondary operator occurrence following the primary operator occurrence.

20 Claims, 3 Drawing Sheets

(51) Int. Cl.
*B60N 2/02* (2006.01)
*B60N 2/75* (2018.01)
*B60N 2/06* (2006.01)
*B60R 25/20* (2013.01)
*B60R 5/04* (2006.01)
*B60N 2/20* (2006.01)

(52) U.S. Cl.
CPC ............ *B60N 2/20* (2013.01); *B60N 2/3011* (2013.01); *B60N 2/757* (2018.02); *B60R 5/044* (2013.01); *B60R 25/2054* (2013.01); *E05F 2015/767* (2015.01); *E05Y 2800/10* (2013.01); *E05Y 2900/546* (2013.01)

(56) References Cited

U.S. PATENT DOCUMENTS

| | | |
|---|---|---|
| 6,275,146 B1 | 8/2001 | Kithil et al. |
| 6,323,761 B1 | 11/2001 | Son |
| 6,478,357 B2 | 11/2002 | Zhou |
| 6,776,448 B2 | 8/2004 | Matsui et al. |
| 7,579,791 B2 | 8/2009 | Nakashima et al. |
| 7,880,481 B2 | 2/2011 | Zangl et al. |
| 8,027,769 B2 | 9/2011 | Oualkadi et al. |
| 8,091,280 B2 | 1/2012 | Hanzel et al. |
| 8,225,458 B1 | 7/2012 | Hoffberg |
| 8,284,022 B2 | 10/2012 | Kachouh |
| 8,606,467 B2 | 12/2013 | Gehin |
| 8,717,429 B2 | 5/2014 | Giraud et al. |
| 8,788,152 B2 | 7/2014 | Reimann et al. |
| 8,829,949 B2 | 9/2014 | Zajc |
| 9,081,032 B2 | 7/2015 | Lange |
| 9,162,685 B2 | 10/2015 | Schindler et al. |
| 9,243,439 B2 | 1/2016 | Adams et al. |
| 9,243,441 B2 | 1/2016 | Gupta et al. |
| 9,283,905 B2 | 3/2016 | Herthan |
| 9,283,994 B2 | 3/2016 | Holzberg et al. |
| 9,290,982 B2 | 3/2016 | Schuetz et al. |
| 9,344,083 B2 | 5/2016 | Elie et al. |
| 9,598,049 B2 | 3/2017 | Sherony |
| 9,689,982 B2 | 6/2017 | Herthan |
| 9,920,564 B2 | 3/2018 | Ebert |
| 9,982,473 B2 | 5/2018 | Herthan et al. |
| 10,053,903 B2 | 8/2018 | Ette |
| 10,055,916 B1 | 8/2018 | Helligrath |
| 2001/0054952 A1 | 12/2001 | Desai et al. |
| 2002/0030666 A1 | 3/2002 | Philipp et al. |
| 2002/0063623 A1 | 5/2002 | Juzswik |
| 2002/0143452 A1 | 10/2002 | Losey et al. |
| 2003/0071738 A1 | 4/2003 | Joly et al. |
| 2004/0085079 A1 | 5/2004 | Lin et al. |
| 2004/0178924 A1 | 9/2004 | Gifford et al. |
| 2005/0114276 A1 | 5/2005 | Hunter et al. |
| 2005/0231194 A1 | 10/2005 | Baldi et al. |
| 2006/0267374 A1 | 11/2006 | Jackson et al. |
| 2006/0293800 A1 | 12/2006 | Bauer et al. |
| 2007/0072154 A1 | 3/2007 | Akatsuka et al. |
| 2007/0285510 A1 | 12/2007 | Morris et al. |
| 2008/0050550 A1 | 2/2008 | Orth et al. |
| 2008/0068145 A1 | 3/2008 | Weghaus et al. |
| 2008/0088188 A1 | 4/2008 | Busch et al. |
| 2008/0195273 A1 | 8/2008 | Matsuura et al. |
| 2008/0296927 A1 | 12/2008 | Gisler et al. |
| 2008/0303685 A1 | 12/2008 | Nakano et al. |
| 2009/0222174 A1 | 9/2009 | Frommer et al. |
| 2009/0243826 A1 | 10/2009 | Touge et al. |
| 2010/0256875 A1 | 10/2010 | Gehin et al. |
| 2011/0118946 A1 | 5/2011 | Reimann et al. |
| 2011/0234370 A1 | 9/2011 | Briese et al. |
| 2011/0276234 A1 | 11/2011 | Van Gastel |
| 2011/0313619 A1 | 12/2011 | Washeleski et al. |
| 2012/0188078 A1 | 7/2012 | Soles et al. |
| 2012/0290177 A1 | 11/2012 | Wagenhuber et al. |
| 2013/0234733 A1 | 9/2013 | Lange et al. |
| 2013/0234828 A1 | 9/2013 | Holzberg et al. |
| 2013/0311039 A1 | 11/2013 | Washeleski et al. |
| 2013/0313099 A1 | 11/2013 | Komaki et al. |
| 2014/0032055 A1 | 1/2014 | Holzberg et al. |
| 2014/0084045 A1 | 3/2014 | Yang et al. |
| 2014/0195073 A1* | 7/2014 | Herthan ............ B60R 25/2045 701/2 |
| 2014/0285217 A1 | 9/2014 | Van Gastel et al. |
| 2014/0324273 A1 | 10/2014 | Russ et al. |
| 2014/0373447 A1* | 12/2014 | Gunreben ............ G01B 7/023 49/31 |
| 2015/0019085 A1 | 1/2015 | Ma |
| 2015/0102024 A1 | 4/2015 | Barfuss et al. |
| 2015/0128497 A1 | 5/2015 | Schuetz et al. |
| 2015/0134208 A1 | 5/2015 | Gunreben |
| 2015/0176322 A1 | 6/2015 | Wuerstlein et al. |
| 2015/0176323 A1 | 6/2015 | Ebert |
| 2015/0176324 A1 | 6/2015 | Ebert |
| 2015/0233167 A1 | 8/2015 | Natsui |
| 2015/0258879 A1 | 9/2015 | Mandzak |
| 2015/0262002 A1 | 9/2015 | Matsunaga |
| 2015/0345205 A1 | 12/2015 | Gunreben et al. |
| 2016/0167621 A1 | 6/2016 | Luu et al. |
| 2016/0186480 A1 | 6/2016 | Krauss et al. |
| 2016/0236654 A1 | 8/2016 | Dietzel et al. |
| 2017/0174179 A1 | 6/2017 | Schumacher et al. |
| 2017/0328116 A1 | 11/2017 | Herthan |
| 2017/0334477 A1 | 11/2017 | Bossler et al. |
| 2018/0159532 A1 | 6/2018 | Pohl et al. |
| 2018/0283081 A1 | 10/2018 | Tamura et al. |

FOREIGN PATENT DOCUMENTS

| | | |
|---|---|---|
| DE | 10254708 | 6/2004 |
| DE | 102004055985 | 4/2006 |
| DE | 102004055982 | 6/2006 |
| DE | 102004057220 | 6/2006 |
| DE | 10205032402 | 9/2006 |
| DE | 102005042402 | 3/2007 |
| DE | 102005055002 | 5/2007 |
| DE | 202005020140 | 6/2007 |
| DE | 10158533 | 2/2009 |
| DE | 102008061225 | 7/2009 |
| DE | 102009004384 | 7/2009 |
| DE | 102009017404 | 11/2009 |
| DE | 102008041354 | 2/2010 |
| DE | 102009041555 | 6/2010 |
| DE | 102008063366 | 7/2010 |
| DE | 102005014211 | 9/2010 |
| DE | 102009047066 | 5/2011 |
| DE | 102009055778 | 6/2011 |
| DE | 102010048144 | 7/2011 |
| DE | 102010006213 | 8/2011 |
| DE | 102010018164 | 8/2011 |
| DE | 102010002559 | 9/2011 |
| DE | 102010049400 | 4/2012 |
| DE | 102010055297 | 6/2012 |
| DE | 102011008277 | 6/2012 |
| DE | 102011051434 | 1/2013 |
| DE | 102011121775 | 1/2013 |
| DE | 110201107279 | 1/2013 |
| DE | 102011112274 | 3/2013 |
| DE | 102012104915 | 12/2013 |
| DE | 102012013065 | 1/2014 |

(56) References Cited

FOREIGN PATENT DOCUMENTS

| | | |
|---|---|---|
| DE | 102013006086 | 1/2014 |
| DE | 102014010471 | 12/2014 |
| DE | 102013010994 | 1/2015 |
| DE | 102013110866 | 4/2015 |
| DE | 102013114881 | 6/2015 |
| DE | 102013114883 | 6/2015 |
| DE | 102014101661 | 8/2015 |
| DE | 102014016422 | 5/2016 |
| EP | 0711977 | 5/1996 |
| EP | 770749 | 5/1997 |
| EP | 1422366 | 5/2000 |
| EP | 2285629 | 3/2012 |
| EP | 2821296 | 1/2015 |
| EP | 2919095 | 9/2015 |
| FR | 2943190 | 9/2010 |
| GB | 2376075 | 12/2002 |
| JP | 02055168 | 2/1990 |
| JP | 6018547 | 1/1994 |
| JP | 2001124861 | 5/2001 |
| JP | 2001238761 | 9/2001 |
| JP | 2002514986 | 5/2002 |
| JP | 2007228640 | 9/2007 |
| JP | 2008111886 | 5/2008 |
| JP | 2009079353 | 4/2009 |
| JP | 2010101836 | 5/2010 |
| JP | 2010531268 | 9/2010 |
| JP | 2010236184 | 10/2010 |
| JP | 2007210542 | 11/2017 |
| WO | 2005084979 | 9/2005 |
| WO | 2007/006514 | 1/2007 |
| WO | 2009000861 | 12/2008 |
| WO | 2010076332 | 7/2010 |
| WO | 2011092206 | 8/2011 |
| WO | 2012052210 | 4/2012 |
| WO | 2012055518 | 5/2012 |
| WO | 2012084111 | 6/2012 |
| WO | 2013034252 | 3/2013 |
| WO | 2013091839 | 6/2013 |
| WO | 2013144765 | 10/2013 |
| WO | 2016114674 | 7/2016 |
| WO | 2017021158 | 2/2017 |

OTHER PUBLICATIONS

How to Restring a Delmar Pleated or Cellular Shade Transcription of text from YouTube video clip uploaded Feb. 7, 2012 by user FixMyBlinds, Retrieved from internet: <https://www.youtube.com/watch?v=MZ93dRmqv_k>.
Non-Final Office Action for U.S. Appl. No. 15/835,018 dated Oct. 22, 2019 (35 pages).
Response to Non-Final Rejection dated Feb. 19, 2019 for U.S. Appl. No. 15/581,821 submitted via EFS-Web on Jul. 19, 2019, 8 pages.
Non-Final Office Action for U.S. Appl. No. 15/581,821 dated Feb. 19, 2019 (38 pages).
Office Action for Japanese Patent Application No. 2018-504879 dated May 29, 2019 (12 pages). German Translation only.
Brose Fahrzeugteile Gmbh & Co.KG, "Sesam oeffne Dich. In: AutomobilKONSTRUKTION," Feb. 2012 (pp. 50-51), with English translation, 4 pages.
European Search Report for EP Application No. 13713812.2 corresponding to U.S. Appl. No. 13/951,163 dated Oct. 31, 2013 (3 pages).
European Search Report for European Patent Application No. 17158669.6 dated Sep. 21, 2017 (6 pages).

File History for U.S. Appl. No. 14/580,562 downloaded Feb. 8, 2018 (379 pages).
German Search Report for DE Application No. 102011112274.9 corresponding to U.S. Appl. No. 14/343,005, dated May 9, 2012 (4 pages).
German Search Report for German Patent Application No. 102013114883.2, dated Feb. 4, 2014 (5 pages).
German Search Report for German Patent Application No. DE102016108702.5 dated Dec. 12, 2016 (7 pages).
"German Search Report," for German Patent Application No. DE102016123646.2 dated Jul. 20, 2017 (10 pages).
"German Search Report," for Priority Application No. DE102015112589.7 dated Dec. 8, 2015 (7 pages).
International Search Report and Written Opinion for PCT/EP2013/063905 related to U.S. Appl. No. 14/412,511, dated Aug. 1, 2013 (8 pages) [English Translation].
"International Search Report and Written Opinion," for PCT Application No. PCT/EP2016/067358 dated Nov. 2, 2016 (10 pages).
International Search Report for application No. PCT/EP2012/003577 corresponding to U.S. Appl. No. 14/343,005 dated Oct. 26, 2012 (6 pages).
International Search Report for application No. PCT/EP2013/066998 corresponding to U.S. Appl. No. 14/580,562, dated Sep. 16, 2013 (3 pages).
International Search Report for PCT/EP2012/005234 related to U.S. Appl. No. 14/367,786, dated Jun. 14, 2013 (3 pages).
International Written Opinion for PCT/EP2012/005234 related to U.S. Appl. No. 14/367,786, completed Jun. 7, 2014 (10 pages).
Non Final Office Action Citation for U.S. Appl. No. 14/367,786 dated Feb. 1, 2016 (15 pages).
Non Final Office Action for U.S. Appl. No. 14/343,005, dated Feb. 11, 2016 (23 pages).
Non Final Office Action for U.S. Appl. No. 13/951,163, dated Dec. 17, 2014 (31 pages).
Non-Final Office Action for U.S. Appl. No. 14/412,511, dated Apr. 11, 2016 (20 pages).
Non-Final Office Action for U.S. Appl. No. 14/581,441, dated Jun. 3, 2016 (10 pages).
Notice of Allowance for U.S. Appl. No. 13/951,163 dated Nov. 6, 2015 (13 pages).
Notice of Allowance for U.S. Appl. No. 13/951,163, dated May 26, 2015 (16 pages).
Office Action for KR Patent Application No. 10-2013-0087175 corresponding to U.S. Appl. No. 13/951,163 completed Jan. 21, 2015 (13 pages).
Restriction Requirement for U.S. Appl. No. 14/367,786 dated Nov. 3, 2015 (8 pages).
Search Report for German Application No. 102012014676.0 corresponding to U.S. Appl. No. 13/951,163, dated Jan. 18, 2013 (5 pages).
Search Report for German Patent Application No. 102012013065.1 related to U.S. Appl. No. 14/412,511, dated Jun. 28, 2013 (5 pages).
Non-Final Office Action for U.S. Appl. No. 15/581,821 dated Apr. 28, 2020 (13 pages).
Response to Final Rejection dated Sep. 25, 2019 for U.S. Appl. No. 15/581,821, submitted via EFS-Web on Mar. 25, 2020, 6 pages.
Final Office Action for U.S. Appl. No. 15/835,018 dated Feb. 6, 2020 (19 pages).
Response to Non-Final Rejection dated Oct. 22, 2019 for U.S. Appl. No. 15/835,018, submitted via EFS-Web on Jan. 22, 2020, 9 pages.
"Sewing with Conductive Thread—What is Conductive Thread?," Sparkfun, Sep. 2015, retrieved from Internet Wayback Machine Jan. 30, 2020; URL <https://learn.sparkfun.com/tutorials/sewing-with-conductive-thread/what-is-conductive-thread> (2 pages).

* cited by examiner

CONTROL SYSTEM FOR A MOTOR-DISPLACEABLE CARGO COMPARTMENT DEVICE OF A MOTOR VEHICLE

CROSS-REFERENCE TO RELATED APPLICATIONS

This application is a national stage application under 35 U.S.C. 371 of International Patent Application Serial No. PCT/EP2016/067358, entitled "Steuersystem Für Eine Motorisch Verstellbare Laderaumvorrichtung Eines Kraftfahrzeugs," filed Jul. 21, 2016, which claims priority from German Patent Application No. DE 10 2015 112 589.7, filed Jul. 31, 2015, the disclosure of which is incorporated herein by reference.

FIELD OF THE TECHNOLOGY

The disclosure relates to a control system for a motor-displaceable cargo compartment device of a motor vehicle, a motor vehicle comprising such a control system, and a method for the control of a motor-displaceable cargo compartment device of a motor vehicle.

BACKGROUND

The actuation of a closure element of a motor vehicle by means of the contactless detection of operating occurrences has been implemented to an increasing extent in middle-class and luxury-class vehicles in recent years. In this case, special significance is attributed to the operating situation in which the operator of the motor vehicle does not have a free hand in order to actuate an electronic vehicle key or the like. This is the case, for example, when the operator would like to load a bulky object into the motor vehicle.

In the known control system (DE 10 2013 114 883 A1), on which the disclosure is based, the contactless detection of an operating occurrence is provided in the form of an operator movement cycle, namely a foot movement of the operator. For this purpose, a capacitively measuring distance sensor is situated in the bumper of the motor vehicle and is suitably monitored by a control arrangement. Upon detection of the operating occurrence, the tailgate of the cargo compartment device located there is displaced in the opening direction by a motor. It is therefore possible for the operator to open and, optionally, close the tailgate without the use of his/her hands.

In the known control system, only one part of the cargo compartment device, namely the tailgate, is designed to be displaceable with the aid of a motor. Other components of the cargo compartment device, for example a cargo compartment floor, a rear seat bench, a through-load opening, or the like, are regularly manually displaceable.

The increase in operator comfort achievable by way of the hands-free operation of the known control system meets its limits in situations in which particularly bulky objects must be transported, wherein the cargo compartment must be expanded in order to load such particularly bulky objects. In this case, manual interventions are regularly required, in particular in order to fold over the backrest of a rear seat row, or the like. The user cannot avoid setting down the bulky object to be loaded in order to expand the cargo compartment. This, in turn, is associated with a reduction in operator comfort.

SUMMARY

A problem addressed by the disclosure is that of designing and refining the known control system in such a way that its operator comfort is increased.

The aforementioned problem is solved in the case of a control system according to the disclosure.

A consideration is that the control system, in itself, which is used for actuating the closure system can also be utilized for expanding the cargo compartment with the aid of a motor, provided the cargo compartment comprises at least one suitably motor-displaceable cargo compartment component such as a motor-displaceable seat arrangement or the like.

Therefore, it is initially provided that the cargo compartment device is equipped with at least one motor-displaceable cargo compartment component such as an above-described seat arrangement. It is also provided that the control arrangement displaces at least one such cargo compartment component with the aid of a motor upon detection, via the operator-occurrence sensor, of a secondary operator occurrence following the primary operator occurrence. In this case, the primary operator occurrence is the operator occurrence, by way of which the actuation of the closure element can be triggered.

The solution according to the disclosure can not only be implemented at low cost, it also results in a substantial increase in operator comfort, since the operator has the option to not only actuate the closure element by means of predetermined operator movement cycles, but also, in particular, to expand the cargo compartment.

In various embodiments, misactivations can be easily ruled out in that secondary operator occurrences, which are far removed from the primary operator occurrence with respect to time, are hidden. In various embodiments, any impending collisions with objects and/or vehicle occupants can be effectively avoided.

In some embodiments, the displaceable cargo compartment component is a seat arrangement, wherein different components of the cargo compartment are displaceable with the aid of a motor, depending on the application. A simple expansion of the cargo compartment can therefore be achieved in most motor vehicles.

In principle, the displacement of the cargo compartment component according to the disclosure can also be utilized for simplifying the loading process, as will be explained further below. In some embodiments, the displacement of the cargo compartment component is carried out, however, in such a way that the cargo compartment is expanded in the manner described above.

According to some variants which can be particularly easy to implement and simultaneously intuitive to operate, the operator movement cycle of the primary operator occurrence and of the secondary operator occurrence are defined to be identical to each other.

The operator movement cycle can be any possible movement cycle. A foot movement as described herein has proven effective for a hands-free operation, in particular.

A high degree of flexibility can be achieved with some embodiments, in that different variants of the secondary operator occurrence are defined, which result in different variants of the displacement of the relevant cargo compartment component. As a result, left and right backrest sections of a seat arrangement, for example, can be displaced in a targeted manner via the secondary operator occurrence.

According to yet another embodiment, a motor vehicle is disclosed, which includes a motor-displaceable cargo compartment device and a control system according to the disclosure, which is assigned to the cargo compartment device.

In some cases the operator comfort for the motor vehicle is increased overall with very little additional outlay, in that, in addition to the contactless actuation of the closure element, in particular the tailgate, the cargo compartment device can also be displaced with the aid of a motor, in particular in order to expand the cargo compartment of the motor vehicle. Moreover, reference is made to all comments related to the control system according to the disclosure.

According to various embodiments, a method for the control of a motor-displaceable cargo compartment device of a motor vehicle is described.

According to the further teaching, at least one aforementioned cargo compartment component is displaced with the aid of a motor upon the detection of a secondary operator occurrence following the primary operator occurrence. The advantages are also reflected here in an increase in operator comfort, which can be implemented with little outlay. Moreover, reference is made to the comments related to the mode of operation of the control system according to the disclosure.

An embodiment provides a control system for a motor-displaceable cargo compartment device of a motor vehicle, wherein the cargo compartment device comprises a motor-displaceable closure element, wherein an operator occurrence sensor, in particular a distance sensor, is provided for the contactless detection of operator occurrences in the form of operator occurrence cycles, wherein a control arrangement monitors the operator occurrence sensor to determine whether a predetermined operator occurrence exists and, upon detection of such a predetermined operator occurrence, displaces the cargo compartment device with the aid of a motor, wherein the control arrangement displaces the closure element in the opening direction with the aid of a motor upon detection of a primary operator occurrence via the operator occurrence sensor, wherein the cargo compartment device comprises at least one motor-displaceable cargo compartment component and the control arrangement displaces at least one such cargo compartment component with the aid of a motor upon detection, via the operator occurrence sensor, of a secondary operator occurrence following the primary operator occurrence.

In various embodiments, wherein the control arrangement displaces the cargo compartment component upon detection of the secondary operator occurrence only under the condition that the secondary operator occurrence follows the primary operator occurrence within a predetermined pause time.

In various embodiments, wherein the control arrangement displaces the cargo compartment component upon detection of the secondary operator occurrence in order to avoid collisions only under the condition that a release state has been detected by the control arrangement, such that the detection of the release state can include a query of at least one state sensor, further possibly that the detection of the release state includes a query of a seat occupancy sensor and/or a seat-belt lock sensor and/or an interior space monitoring sensor.

In various embodiments, wherein the cargo compartment component, which is displaceable by means of the control arrangement, comprises a seat arrangement, in particular a seat row, including a seat part, in particular a seat bench, and including a backrest, and that the seat arrangement can be unlocked or moved, in entirety or in sections, with the aid of a motor, and/or that the backrest of the seat arrangement can be unlocked or moved, in entirety or in sections, with the aid of a motor, and/or that the backrest comprises a through-load opening which can be unlocked or moved with the aid of a motor, and/or that the backrest comprises at least one headrest which can be unlocked or moved with the aid of a motor.

In various embodiments, wherein upon detection of the secondary operator occurrence following the primary operator occurrence, the control arrangement unlocks or moves the seat arrangement, in entirety or in sections, with the aid of a motor, and/or unlocks or moves the backrest of the seat arrangement, in entirety or in sections, with the aid of a motor, and/or unlocks or moves the through-load opening with the aid of a motor, and/or unlocks or moves the at least one headrest with the aid of a motor.

In various embodiments, wherein upon detection of the secondary operator occurrence following the primary operator occurrence, the control arrangement carries out the displacement of the at least one cargo compartment component in such a way that the cargo compartment is expanded.

In various embodiments, wherein the cargo compartment component is a cargo compartment cover which can be moved into an open position with the aid of a motor and that, upon detection of the secondary operator occurrence following the primary operator occurrence, the control arrangement extends the cargo compartment cover into the open position, and/or that the cargo compartment component is a cargo compartment floor which can be extended, with the aid of a motor, out of a body opening assigned to the closure element into a loading position and that, upon detection of the secondary operator occurrence following the primary operator occurrence, the control arrangement extends the cargo compartment floor into the loading position.

In various embodiments, wherein the operator movement cycles of the primary operator occurrence and of the secondary operator occurrence are defined differently and can be distinguished from each other by means of the control arrangement, or that the operator occurrence cycles of the primary operator occurrence and of the secondary operator occurrence are defined to be identical to each other.

In various embodiments, wherein the operator movement cycle of the primary operator occurrence and/or of the secondary operator occurrence are/is defined as a movement of a body part, in particular of a foot, of the operator, such that the operator movement cycle of the primary operator occurrence and/or of the secondary operator occurrence can be defined as a to-and-fro movement of the body part, in particular of a foot, of the operator.

In various embodiments, wherein the secondary operator occurrence is defined in at least two variants and in that the control arrangement carries out a different displacement of the at least one cargo compartment component depending on which variant of the secondary operator occurrence has been detected.

In various embodiments, wherein the backrest of the seat arrangement is divided and comprises a left backrest section and a right backrest section, each of which can be displaced with the aid of a motor, and in that the control arrangment moves the left backrest section or the right backrest section depending on which variant of the secondary operator occurrence has been detected.

In various embodiments, wherein the operator occurrence sensor, in particular the distance sensor, is designed to measure distance longitudinally and transversely to the longitudinal extension thereof, such as the operator occurrence sensor, in the installed state, is situated in or on a body component, in particular in or on a lower cladding part, of the motor vehicle.

An embodiment provides for a motor vehicle comprising a motor-displaceable cargo compartment device and comprising a control system assigned to the cargo compartment device as described herein.

An embodiment provides for a method for the control of a motor-displaceable cargo compartment device of a motor vehicle, wherein the cargo compartment device comprises a motor-displaceable closure element, wherein an operator occurrence sensor, in particular a distance sensor, is provided for the contactless detection of operator occurrences in the form of operator occurrence cycles, wherein the operator occurrence sensor is monitored in order to determine whether a predetermined operator occurrence exists and, upon detection of such a predetermined operator occurrence, the cargo compartment device is displaced with the aid of a motor, wherein the closure element is displaced in the opening direction with the aid of a motor upon detection of a primary operator occurrence, wherein the cargo compartment device comprises at least one motor-displaceable cargo compartment component and that at least one such cargo compartment component is displaced with the aid of a motor upon detection of a secondary operator occurrence following the primary operator occurrence.

BRIEF DESCRIPTION OF THE DRAWINGS

Various embodiments are explained in greater detail with reference to the drawings. In the drawings.

DETAILED DESCRIPTION

Figure 1:
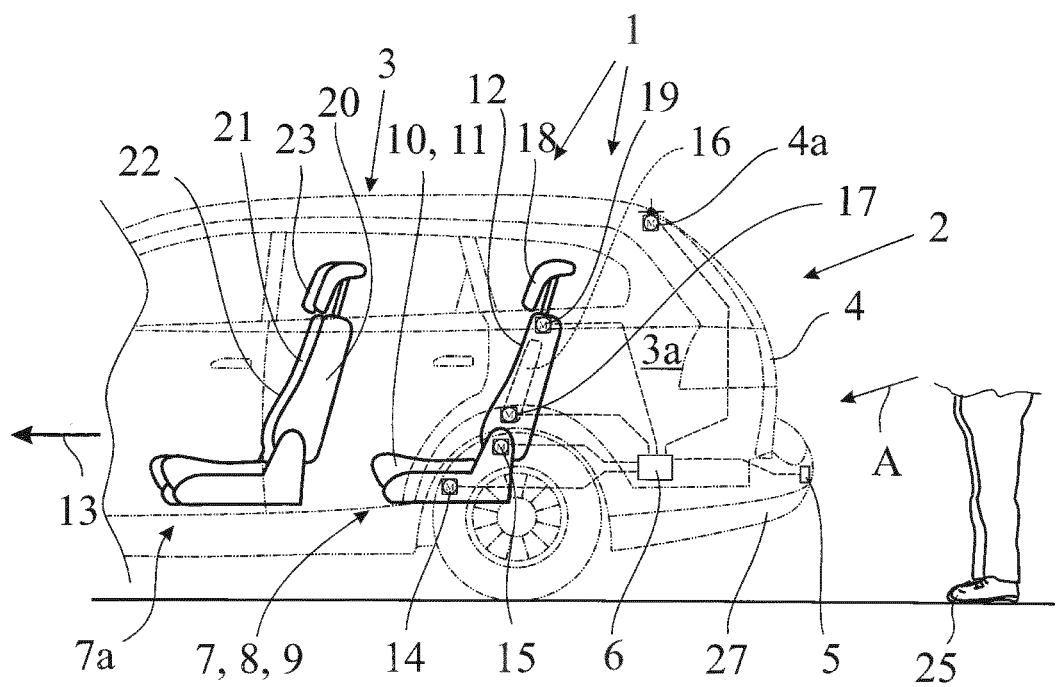
FIG. 1 shows the rear region of a motor vehicle according to some embodiments, including a control system according to some embodiments.
Figure 1:
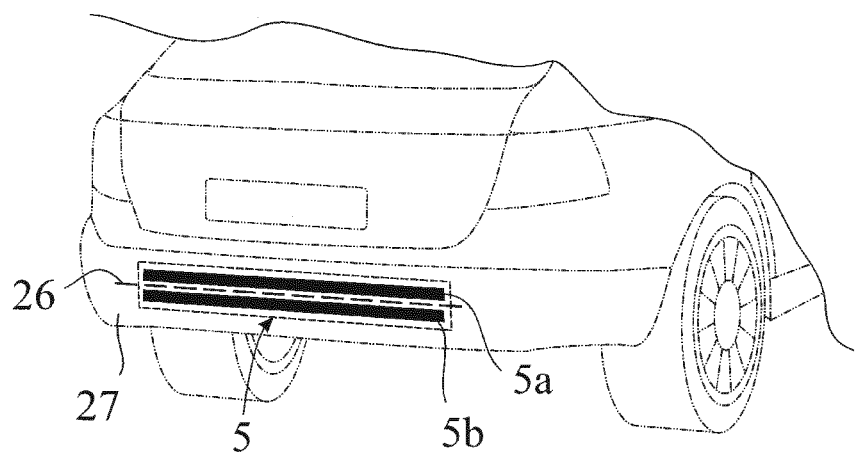

The control system 1 according to the disclosure is used for controlling a motor-displaceable cargo compartment device 2 of a motor vehicle 3. The cargo compartment device 2 comprises a motor-displaceable closure element 4, which is designed, in this case, as a tailgate, to which is assigned a drive 4a for the motor-driven displacement thereof.

The term "closure element" is to be broadly interpreted in the present case. It includes, for example, doors, in particular sliding doors, gates, in particular aforementioned tailgates, hatches, engine hoods, or the like, of a motor vehicle. All comments related to a tailgate apply similarly for all other types of closure elements.

The term "motor-driven displacement" is likewise to be broadly interpreted in this case and includes any type of displacement associated with the relevant component. It includes, for example, both a motor-driven movement of the component to be displaced, or a part thereof, as well as merely a motor-driven release, in particular an unlocking of the relevant component, and therefore a manual or spring-assisted movement of the component is enabled.

An operator occurrence sensor 5 is provided for the purpose of the contactless detection of operator occurrences in the form of operator movement cycles; in this case, the operator occurrence sensor is a distance sensor. The operator occurrence sensor 5 can comprise a plurality of sensor components, as will be explained further below.

In addition, a control arrangement 6 is provided, which can be a component of a central vehicle controller. In this case, the control arrangement 6 is a decentralized control arrangement, however, which optionally communicates with a central vehicle controller.

The control arrangement 6 monitors the operator occurrence sensor 5 to determine whether a predetermined operator occurrence exists. Upon detection of such a predetermined operator occurrence, the cargo compartment device 2 is displaced with the aid of a motor in a likewise predetermined way.

Figure 2:
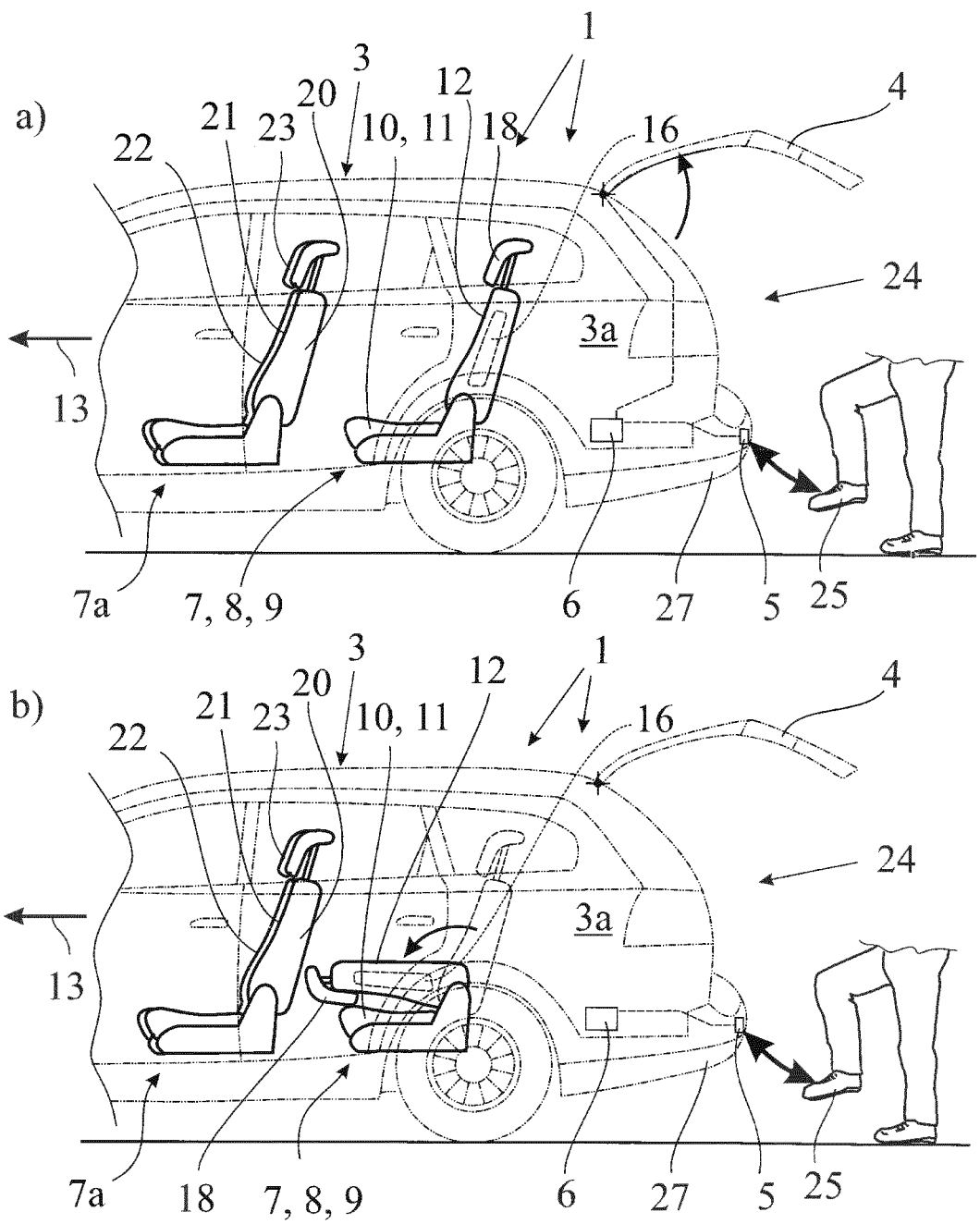
FIG. 2 shows the rear region of the motor vehicle according to FIG. 1 a) after the detection of the primary operator occurrence and b) after the detection of the secondary operator occurrence.

Specifically, upon detection of a primary operator occurrence via the operator occurrence sensor 5, the control arrangement 6 displaces the closure element 4 with the aid of a motor in the opening direction, as shown in FIG. 2a.

It should be pointed out that a motor-driven displacement of the closure element 4 in the closing direction is also possible by way of the operator occurrence monitoring. In principle, the closure element 4 is displaceable between a closed position and an open position with the aid of a motor, wherein a displacement of the closure element 4 out of the closed position in the opening direction, in particular into the open position, in response to the detection of the primary operator occurrence, can be also carried out. It is also conceivable that a motor-driven displacement of the closure element 4 in the closing direction takes place in response to the detection of a predetermined operator occurrence, which is of minor significance in the present case, however.

Figure 3:
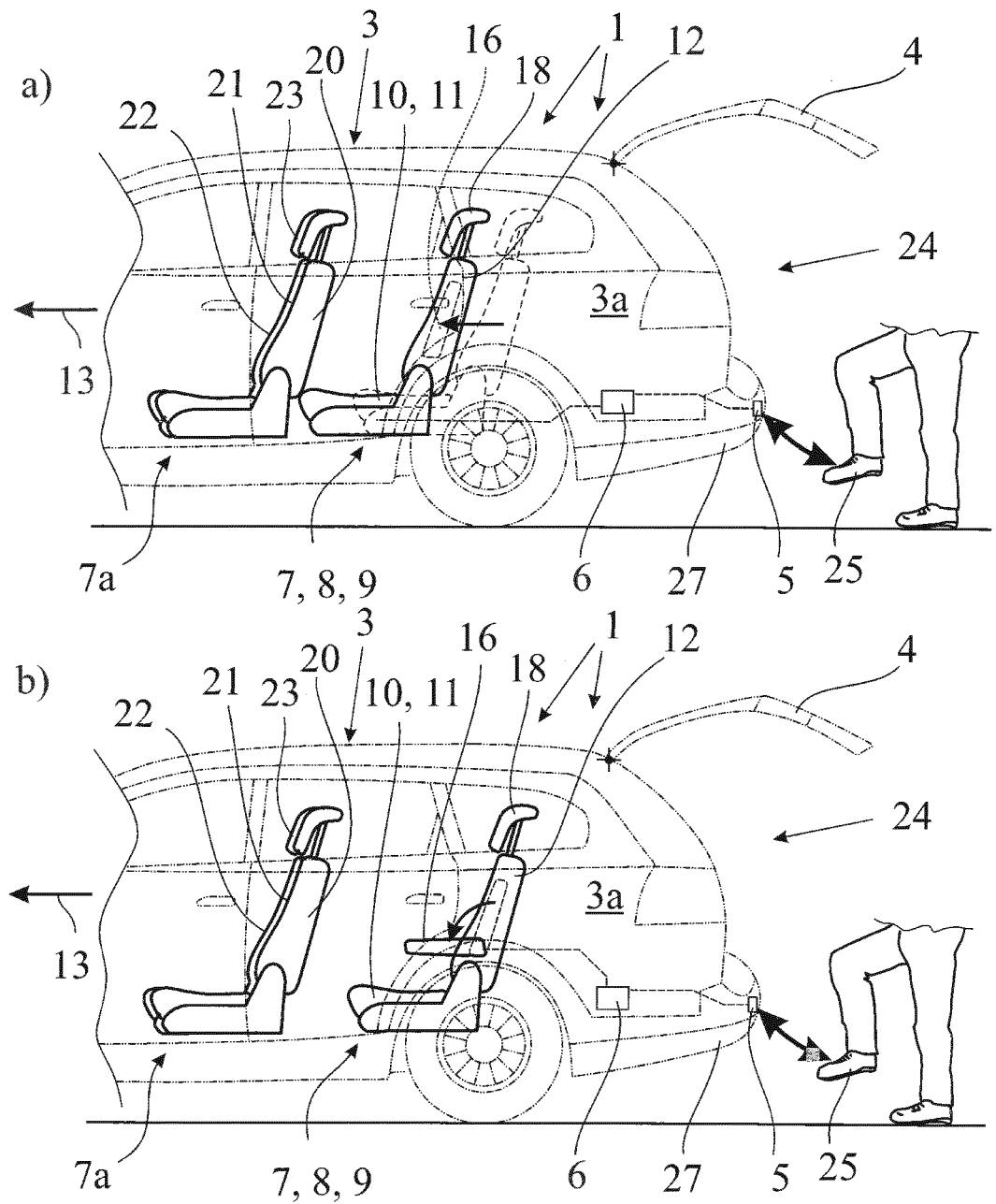
FIG. 3 shows the rear region of the motor vehicle according to FIG. 1 a) after detection of the secondary operator occurrence in a second embodiment and b) after detection of the secondary operator occurrence in a third embodiment.

It is essential that the cargo compartment device 2 comprises at least one motor-displaceable cargo compartment component 7, wherein the control arrangement 6 displaces at least one such cargo compartment component 7 with the aid of a motor upon detection, via the operator occurrence sensor 5, of a secondary operator occurrence following the primary operator occurrence. This is shown in a total of three exemplary embodiments in FIGS. 2b, 3a and 3b. The displacement of the cargo compartment component 7 according to the disclosure can be utilized for expanding the cargo compartment 3a of the motor vehicle 3, as will be described below.

One necessary condition for the reaction, to the primary operator occurrence and the secondary operator occurrence taking place can consist in the presence of an electronic vehicle key being detected, by the control arrangement 6, in the proximity of the motor vehicle 3. The control arrangement 6 can trigger a safety dialogue with the electronic vehicle key in order to ascertain whether the particular electronic vehicle key and, therefore, the operator carrying the electronic vehicle key, is authenticated for opening the motor vehicle.

In order to avoid an unexpected reaction of the control system 1 to an operator occurrence, it can be provided that the control arrangement 6 displaces the cargo compartment component 7 upon detection of the secondary operator occurrence only under the condition that the secondary operator occurrence follows the primary operator occurrence within a predetermined pause time. If the predetermined pause time has transpired, the secondary operator occurrence does not result in the displacement of the cargo compartment component 7 assigned to this operator occurrence. Optionally, it can be provided that the secondary operator occurrence then merely triggers the motor-driven closing of the closure element 4.

An automatic displacement of a cargo compartment component 7 is associated, in principle, with a certain risk of a collision with objects and/or vehicle occupants and, therefore, with a risk of damage and/or injury. In order to avoid this risk, it can be provided that the control arrangement 6 displaces the cargo compartment component 7 upon detection of the secondary operator occurrence in order to avoid collisions only under the condition that a corresponding release state has been detected by the control arrangement 6. In particular, this detection of the release state includes a query of at least one state sensor, which can provide information regarding an impending collision. A state sensor which is usually provided anyway in a modern motor vehicle can be utilized in this case. In some embodiments, the detection of the release state includes a query of a seat occupancy sensor and/or a seat-belt lock sensor and/or an interior space monitoring sensor. Provided the query of the particular state sensor yields a possible impending collision, the displacement of the particular cargo compartment component 7 is not triggered by the control arrangement 6. The control arrangement 6 then, in some embodiments outputs a suitable, in particular acoustic, warning signal.

Numerous implementation options are conceivable for the cargo compartment component 7 which is displaceable by means of the control arrangement 6. In the exemplary embodiment which is represented, the cargo compartment component 7 comprises a seat arrangement 8 which can be a seat row 9. The seat arrangement 8 comprises a seat part 10 which, in this case, is a seat bench 11, as well as a backrest 12. In this case, the seat arrangement 8, in entirety, can be unlocked or moved with the aid of a motor. In both cases, this is utilized for displacing the seat arrangement 8 along the vehicle longitudinal direction 13. This displaceability can also be limited, in principle, to only one part of the seat arrangement 8. A motor-driven drive 14, which is shown in FIG. 1, is provided for the motor-driven displacement of the seat arrangement 8 in entirety. All the drives are represented only in FIG. 1 in the present case for the sake of clarity.

Alternatively or additionally, the backrest 12 of the seat arrangement 8 can be unlocked or moved with the aid of a motor in entirety or in sections. This relates, first and foremost, to a folding-over of the backrest 12, as shown by the transition from FIG. 2a to FIG. 2b. For this purpose, the seat arrangement 8 is equipped with a corresponding drive 15.

Alternatively or additionally, the backrest 12 can be equipped with a through-load opening 16 which can likewise be unlocked or moved with the aid of a motor. The through-load opening 16 can be a flap which, in the open state, exposes an opening in the particular backrest 12. The through-load opening 16 can be equipped with a suitable drive 17, which is also shown in FIG. 1, for the motor-driven displacement of the through-load opening.

Alternatively or additionally, the backrest 12 comprises at least one headrest 18 which can be unlocked or moved with the aid of a motor. A drive 19 is assigned to the headrest 18 for this purpose.

It should be pointed out that the aforementioned drives 14, 15, 17-19 can be provided or not, depending on the application. It is also conceivable that at least one of the drives carries out two or more of the particular motor-driven displacements.

A great many possibilities for the displacement, according to the disclosure, of the seat arrangement 8 are conceivable, which are described in the following with reference to the drawing.

In some embodiments, the seat arrangement 8 is unlocked or moved, in entirety or in sections, with the aid of a motor upon detection of the secondary operator occurrence following the primary operator occurrence. The unlocking can make it possible for the seat arrangement 8 to be manually displaceable along the vehicle longitudinal direction 13. In the case of the motor-driven unlocking, the object to be loaded can be pushed into the cargo compartment 3a, whereby the unlocked seat arrangement 8 is correspondingly pushed.

In yet another embodiment, the motor-driven displacement of the seat arrangement 8 is a motor-driven displacement of the seat arrangement 8 in the vehicle longitudinal direction 13, however, and therefore the cargo compartment 3 expands automatically and without the need for an action of force provided by an operator (FIG. 3a). The motor-driven movement is advantageous, in particular, since the extent of the movement, i.e., the longitudinal position of the seat arrangement 8 along the vehicle longitudinal direction 13, can be predefined, i.e., set, by the control arrangement 6.

Alternatively or additionally, it can be provided that, upon detection of the secondary operator occurrence following the primary operator occurrence, the control arrangement 6 unlocks or moves the backrest 12 of the seat arrangement 8, in entirety or in sections, with the aid of a motor. The motor-driven unlocking makes it possible for the unlocked backrest 12 to be manually folded over, and therefore, in turn, an expansion of the cargo compartment 3a results. In various embodiments, a motor-driven movement of the backrest 12 is provided in this case, and therefore the cargo compartment 3a, in turn, automatically expands (FIG. 2b). The motor-driven movement, i.e., the motor-driven folding-over in this case, is advantageous, in particular, since the extent of the movement, i.e., the fold-over angle, can be predefined by the control arrangement 6 as described above.

During transport of elongate objects in particular, it can be advantageous to unlock or move the through-load opening 16 in the backrest 12 with the aid of a motor upon detection of the secondary operator occurrence following the primary operator occurrence. Similarly to the case of the backrest 12, in this case, the through-load opening 16 can be manually folded over after the motor-driven unlocking, and therefore the elongate object can be guided through the backrest 12. In the case of the motor-driven movement of the through-load opening 16, it is advantageous, in turn, that a predetermined movement, in particular a predetermined angular displacement, can be predefined by the control arrangement 6 (FIG. 3b).

It can also be advantageous that the at least one headrest 18 is unlocked or moved with the aid of a motor upon detection of the secondary operator occurrence following the primary operator occurrence. In the case of the motor-driven unlocking of the headrest 18, it can be the case that the headrest 18, after having been unlocked, moves into a park position in a spring-driven manner. It is also conceivable that the headrest 18 can be manually moved after the motor-driven unlocking. In this case, however, that the headrest 18 is moved with the aid of a motor, and therefore, in turn, the extent of the movement can be predefined by the control arrangement 6 (FIG. 2b).

In some embodiments, upon detection of the secondary operator occurrence following the primary operator occurrence, at least two subcomponents 8-12, 16, 18 of the cargo compartment component 7 are displaced with the aid of a motor. The motor-driven displacement of these subcomponents can take place simultaneously or sequentially, wherein a time advantage results for the simultaneous displacement. In some embodiments, upon detection of the secondary operator occurrence following the primary operator occurrence, the movement of the backrest 12, in particular the folding-over of the backrest 12, as well as the movement of the headrest 18, in particular the retraction of the headrest 18, is triggered by the control arrangement 6. This is apparent from the transition from FIG. 2a to FIG. 2b. The additional movement of the headrest 18 ensures that, when the backrest 12 is folded over, a collision with other subcomponents located in the motor vehicle 3 does not result. In addition, it can be provided that the seat arrangement 8 is displaced, in entirety, with the aid of a motor, in order to further enlarge the cargo compartment 3a.

As mentioned above, the motor-driven movement of the subcomponents 8-12, 16, 18 is advantageous insofar as the extent of the movement of the control arrangement 6 can be predefined. It is therefore also possible, for example, to merely displace the seat arrangement 8 in such a way that the cargo compartment 3a can be expanded, but the usability of the seat arrangement 8 as a means for the vehicle passengers to sit is retained. In this case, the motor-driven displacement can include, for example, the displacement of the seat arrangement 8, in entirety, in the vehicle longitudinal direction 13 and a displacement of the backrest 12 into approximately vertical positions.

If two or more seat rows 9 offset in the vehicle longitudinal direction 13 are provided (not represented), the control arrangement 6 displaces the seat row 9 which abuts the cargo compartment 3a upon detection of the secondary operator occurrence following the primary operator occurrence. In addition, it can also be provided that the further seat row or all seat rows 9 are moved, in particular folded over, with the aid of a motor upon detection of the secondary operator occurrence.

In the exemplary embodiment which is represented, only one seat row 9 is provided, as mentioned above, which is offset in the vehicle longitudinal direction 13 with respect to the cargo compartment components 7a of a driver's seat 20 and a passenger's seat 21. In this case, it can also be advantageous that the passenger's seat 21 is displaced, in entirety, in the vehicle longitudinal direction 13, i.e., toward the front, and/or that the backrest 22 thereof is unlocked or moved with the aid of a motor, in particular being folded over, and/or that the headrest 23 thereof is unlocked or moved with the aid of a motor, provided the secondary operator occurrence following the primary operator occurrence has been detected by the control arrangement 6. The drives required therefor are not represented in FIG. 1 for the sake of clarity.

The cargo compartment component 7, which can be displaced with the aid of a motor upon detection of the secondary operator occurrence, can be a non-illustrated cargo compartment cover which can be moved into an open position with the aid of a motor. Upon detection of the secondary operator occurrence following the primary operator occurrence, the control arrangement 6 can move the cargo compartment cover into the open position, and therefore the accessibility of the cargo compartment 3a is increased.

Instead of expanding the cargo compartment 3a, the motor-driven displacement of the particular cargo compartment component 7 can also be used to improve the loadability. In this case, the relevant cargo compartment component 7 is a non-illustrated cargo compartment floor which can be extended, with the aid of a motor, out of a body opening 24 assigned to the closure element 4 into a loading position, wherein, upon detection of the secondary operator occurrence following the primary operator occurrence, the control arrangement 6 extends the cargo compartment floor into the loading position. The operator is then spared the need to lift the object to be loaded, which may be heavy, in one cantilevered movement into the cargo compartment 3a. A corresponding increase in operator comfort also results in this case.

It should also be pointed out that the cargo compartment component 7 which is adjustable with the aid of a motor upon detection of the secondary operator occurrence can also be other components, for example a sliding roof or a panoramic roof, and therefore, upon detection of the secondary operator occurrence following the primary operator occurrence, the loading of, in particular, long and unwieldy objects is simplified.

In some embodiments, the operator movement cycles of the primary operator occurrence and of the secondary operator occurrence are defined differently and can be distinguished from each other by means of the control arrangement 6. For example, the distinguishable operator movement cycles can include different directions of movement. Given that the operator occurrences can be differentiated, misactivations can be reduced to a minimum.

Alternatively, it can also be provided, however, that the operator movement cycles of the primary operator occurrence and of the secondary operator occurrence are defined to be identical to each other. For the operator, this means that only one and the same operator movement cycle must be repeated for the motor-driven displacement of the particular cargo compartment component 7. This results in a high level of operator comfort, since it is not required that the operator "learn" several operator movement cycles.

The operator movement cycle of the primary operator occurrence and/or of the secondary operator occurrence can be defined as a movement of a body part, in particular of a foot 25, of the operator. This is apparent in FIGS. 2 and 3. In this case, the operator movement cycle of the primary operator occurrence and/or of the secondary operator occurrence are/is defined as a to-and-fro movement of the body part, in particular of a foot 25, of the operator.

In this case, it must be taken into account that, in the case of the particular foot movement, it is not necessarily the foot 25 itself that must be detected by the operator occurrence sensor 5. It suffices, in principle, to carry out a corresponding detection of the entire leg of the operator.

The aforementioned to-and-fro movement can be provided, in principle, as a so-called kick movement which is carried out essentially transversely to the outer surface of the vehicle. It can also be a so-called wiping movement, however, which is carried out along the outer surface of the vehicle. Other trajectories of the operator occurrence cycle are conceivable. Examples thereof are circular movement cycles, vertically extending movement cycles (stamping the foot), or the like.

A particularly high level of flexibility in the operation of the control system 1 results due to the fact that the secondary operator occurrence, in various embodiments, is defined in at least two variants, wherein the control arrangement 6 carries out a different displacement of the at least one cargo compartment component 7 depending on which variant of the secondary operator occurrence has been detected.

The aforementioned definition of the secondary operator occurrence in at least two variants can be applied particularly advantageously to a seat arrangement 8, the backrest 12 of which is divided and comprises a left backrest section and a right backrest section, wherein the backrest sections can each be displaced with the aid of a motor. In this case, the control arrangement 6 moves according to which variant of the secondary operator occurrence has been detected, i.e., the left backrest section or the right backrest section.

According to yet another embodiment, the aforementioned actuation of the backrest sections results particularly intuitively in that the first variant of the secondary operator occurrence is defined as a wiping movement to the left and the second variant of the secondary operator occurrence is defined as a wiping movement to the right, with respect to the vehicle longitudinal direction 13 in each case.

The detection of the first variant of the secondary operator occurrence then results in the motor-driven movement, in particular the folding-over of the left backrest section, while the detection of the second variant of the secondary operator occurrence triggers, via the control arrangement 6, a motor-driven movement of the right backrest section, in particular a folding-over of the right backrest section.

It should be pointed out that a reaction of the control arrangement 6 to further operator occurrences which follow the detection of the secondary operator occurrence can be provided. For the sake of clarity, only two operator occurrences are under discussion in this case, namely the primary operator occurrence and the secondary operator occurrence.

Numerous advantageous variants are conceivable for the embodiment of the operator occurrence sensor 5. In this case, the operator occurrence sensor 5 is designed as a distance sensor. It is conceivable that, alternatively, the operator occurrence sensor 5 is designed as an imaging sensor, in particular as a camera-based sensor.

In this case, the operator occurrence sensor 5 is designed to measure distance longitudinally and transversely with respect to the longitudinal extension 26 thereof. In the exemplary embodiment which is represented in FIG. 1 and, in this respect the distance sensor is a capacitively measuring sensor comprising two elongate measuring electrodes 5a, 5b, which allows for a simple design and a high degree of robustness, in particular with respect to environmental influences such as moisture, soiling, or the like.

The operator occurrence sensor 5, in the installed state, is situated transversely to the vehicle longitudinal direction 13, as represented in FIG. 1. In the case of a closure element 4 designed as a sliding side door, it can also be advantageous, however that the operator occurrence sensor 5, in the installed state, is situated along the vehicle longitudinal direction 13.

In various embodiments, the operator occurrence sensor 5, in the installed state, is situated in or on a body component, in particular in or on a lower cladding part 27, i.e., on a bumper of the motor vehicle 3 in this case. In this case, the elongate operator occurrence sensor 5 extends essentially horizontally, in particular, and therefore the operator can carry out the operator occurrence at various points along the motor vehicle 3.

According to yet another teaching, which has independent significance, the motor vehicle 3 comprising a cargo compartment 3a and a cargo compartment device 2 which is adjustable with the aid of a motor, and a control system 1 which is assigned to the cargo compartment device 2. Reference is made to all comments, in the full scope thereof, made with respect to the control system 1 according to the disclosure, which are suitable for describing the motor vehicle 3 as such.

According to yet another teaching, which likewise has independent significance, the method for the control of a motor-displaceable cargo compartment device 2 of a motor vehicle 3.

The method according to the disclosure can be utilized on a cargo compartment device 2 which, as described above, comprises a closure element 4 which is adjustable with the aid of a motor, wherein an operator occurrence sensor 5, which is a distance sensor in this case, is provided for the contactless detection of operator occurrences in the form of operator occurrence cycles.

According to some embodiments, the operator occurrence sensor 5, as likewise described in conjunction with the control system 1 according to the disclosure, is monitored to determine whether a predetermined operator occurrence exists, wherein the cargo compartment device 2 is displaced with the aid of a motor upon detection of such a predetermined operator occurrence. In this case as well, it is provided that the closure element 4 is displaced with the aid of a motor in the opening direction upon detection of a primary operator occurrence.

According to the method, it can be essential that the cargo compartment device 2 comprises at least one motor-displaceable cargo compartment component 7 and that at least one such cargo compartment component 7 is displaced with the aid of a motor upon detection of a secondary operator occurrence following the primary operator occurrence.

The method according to the disclosure reflects the mode of operation of the control system 1 according to the disclosure, and therefore reference is made to the descriptions of the mode of operation of the control system 1 according to the disclosure, in the full scope thereof, to describe the method according to the disclosure.

The invention claimed is:

1. A control system for a motor-displaceable cargo compartment device of a motor vehicle,
    wherein the motor-displaceable cargo compartment device comprises a motor-displaceable closure element, the control system comprises:
    a control arrangement that monitors the operator occurrence sensor to determine whether a predetermined operator occurrence exists and, upon detection of such a predetermined operator occurrence, displaces the motor-displaceable cargo compartment device motorically,
    wherein the control arrangement motorically displaces the motor-displaceable closure element in an opening direction upon detection of a primary operator occurrence via the operator occurrence sensor, and
    wherein the motor-displaceable cargo compartment device comprises at least one motor-displaceable cargo compartment component and the control arrangement displaces at least one such motor-displaceable cargo compartment component motorically upon detection, via the operator occurrence sensor, of a secondary operator occurrence following the primary operator occurrence.

2. The control system as claimed in claim 1, wherein the control arrangement displaces the motor-displaceable cargo compartment component upon detection of the secondary operator occurrence only under the condition that the secondary operator occurrence follows the primary operator occurrence within a predetermined pause time.

3. The control system as claimed in claim 1, wherein the control arrangement displaces the motor-displaceable cargo compartment component upon detection of the secondary operator occurrence in order to avoid collisions only under the condition that a release state has been detected by the control arrangement.

4. The control system as claimed in claim 3, wherein the detection of the release state includes a query of at least one state sensor.

5. The control system as claimed in claim 4, wherein the detection of the release state includes a query of a seat occupancy sensor and/or a seat-belt lock sensor and/or an interior space monitoring sensor.

6. The control system as claimed in claim 1, wherein the motor-displaceable cargo compartment component, which is displaceable by the control arrangement, comprises a seat arrangement, including a seat part, and including a backrest, and wherein the seat arrangement can be motorically unlocked or moved, in entirety or in sections and/or wherein the backrest of the seat arrangement can be motorically unlocked or moved, in entirety or in sections, and/or wherein the backrest comprises a through-load opening which can be motorically unlocked or moved, and/or wherein the backrest comprises at least one headrest which can be motorically unlocked or moved.

7. The control system as claimed in claim 6, wherein, upon detection of the secondary operator occurrence following the primary operator occurrence, the control arrangement motorically unlocks or moves the seat arrangement, in entirety or in sections and/or motorically unlocks or moves the backrest of the seat arrangement, in entirety or in sections, and/or motorically unlocks or moves the through-load opening and/or motorically unlocks or moves the at least one headrest.

8. The control system as claimed in claim 6, wherein the secondary operator occurrence is defined in at least two variants and wherein the control arrangement carries out a different displacement of the at least one motor-displaceable cargo compartment component depending on which variant of the secondary operator occurrence has been detected.

9. The control system as claimed in claim 8, wherein the backrest of the seat arrangement is divided and comprises a left backrest section and a right backrest section, each of which can be displaced motorically, and wherein the control arrangement moves the left backrest section or the right backrest section depending on which variant of the secondary operator occurrence has been detected.

10. The control system as claimed in claim 1, wherein, upon detection of the secondary operator occurrence following the primary operator occurrence, the control arrangement carries out the displacement of the at least one motor-displaceable cargo compartment component in such a way that a cargo compartment is expanded.

11. The control system as claimed in claim 1, wherein the motor-displaceable cargo compartment component is a cargo compartment cover which can be moved into an open position motorically and wherein, upon detection of the secondary operator occurrence following the primary operator occurrence, the control arrangement extends the cargo compartment cover into the open position, and/or wherein the motor-displaceable cargo compartment component is a cargo compartment floor which can be extended, motorically, out of a body opening assigned to the motor-displaceable closure element into a loading position and wherein, upon detection of the secondary operator occurrence following the primary operator occurrence, the control arrangement extends the cargo compartment floor into the loading position.

12. The control system as claimed in claim 1, wherein the operator occurrence cycles of the primary operator occurrence and of the secondary operator occurrence are defined differently and can be distinguished from each other by the control arrangement, or wherein the operator occurrence cycles of the primary operator occurrence and of the secondary operator occurrence are defined to be identical to each other.

13. The control system as claimed in claim 1, wherein the operator occurrence cycle of the primary operator occurrence and/or of the secondary operator occurrence are/is defined as a movement of a body part of the operator.

14. The control system as claimed in claim 13, wherein the operator occurrence cycle of the primary operator occurrence and/or of the secondary operator occurrence is defined as a to-and-fro movement of the body part of the operator.

15. The control system as claimed in claim 1, wherein the operator occurrence sensor is designed to measure distance longitudinally and transversely to the longitudinal extension thereof.

16. The control system as claimed in claim 15, wherein the operator occurrence sensor, in the installed state, is situated in or on a body component of the motor vehicle.

17. The control system as claimed in claim 16, wherein the operator occurrence sensor, in the installed state, is in or on a lower cladding part of the motor vehicle.

18. A motor vehicle comprising a motor-displaceable cargo compartment device and comprising a control system assigned to the motor-displaceable cargo compartment device as claimed in claim 1.

19. The control system as claimed in claim 1, wherein the operator occurrence sensor is a distance sensor.

20. A method for controlling a motor-displaceable cargo compartment device of a motor vehicle, wherein the motor-displaceable cargo compartment device comprises a motor-displaceable closure element, the method comprises:
providing contactless detection of operator occurrences in a form of operator occurrence cycles using an operator occurrence sensor,
monitoring the operator occurrence sensor in order to determine whether a predetermined operator occurrence exists and, upon detection of such a predetermined operator occurrence, motorically displacing the motor-displaceable cargo compartment device, motorically displacing the motor-displaceable closure element in the opening direction upon detection of a primary operator occurrence, and
wherein the motor-displaceable cargo compartment device comprises at least one motor-displaceable cargo compartment component and wherein at least one such motor-displaceable cargo compartment component is displaced motorically upon detection of a secondary operator occurrence following the primary operator occurrence.

* * * * *